April 30, 1968 R. G. RATCHFORD 3,380,205
FOUNDATIONS FOR TRAILER TYPE HOMES
Filed May 7, 1965 2 Sheets-Sheet 2
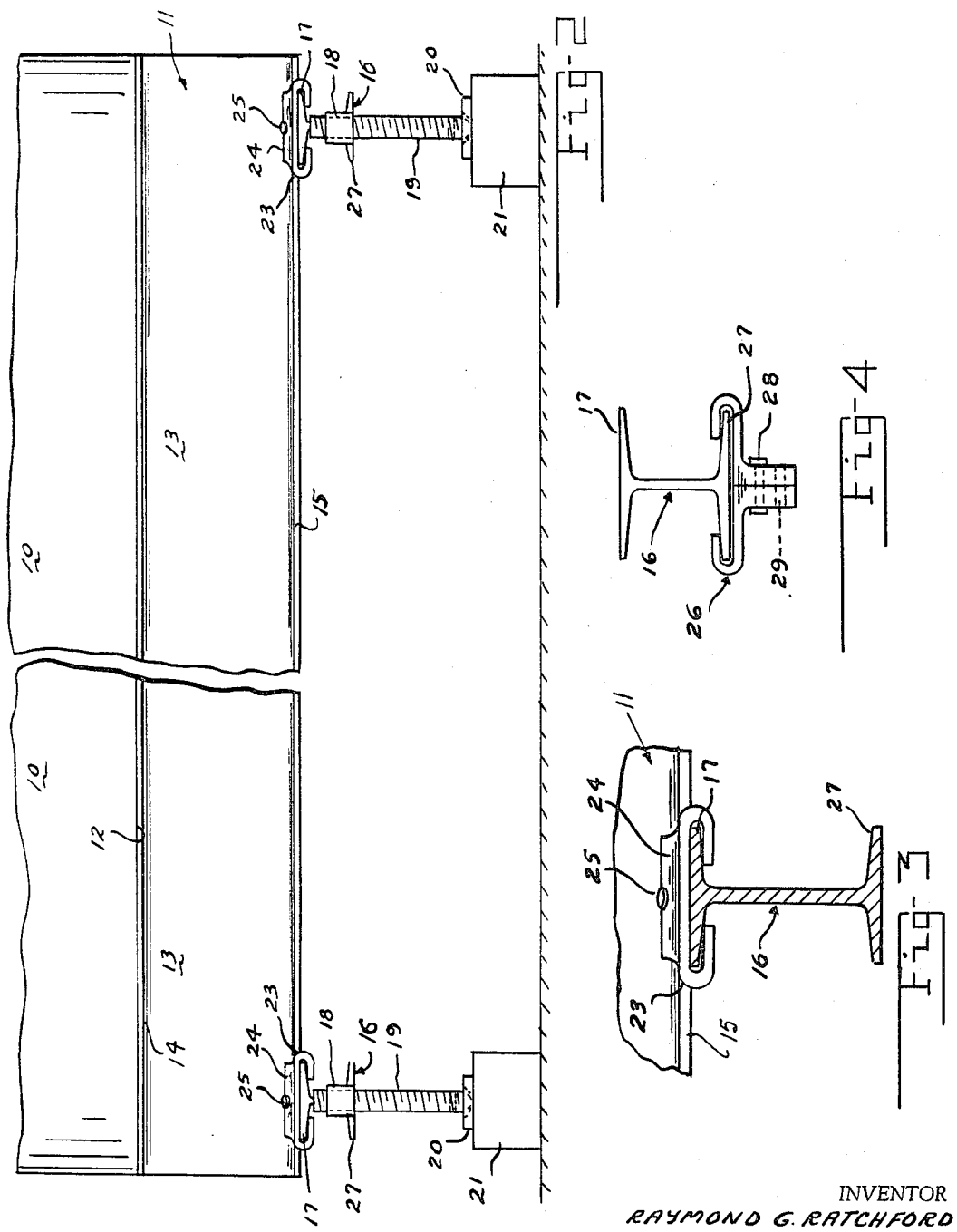
INVENTOR
RAYMOND G. RATCHFORD
BY *Jerome P. Bloom*
ATTORNEY

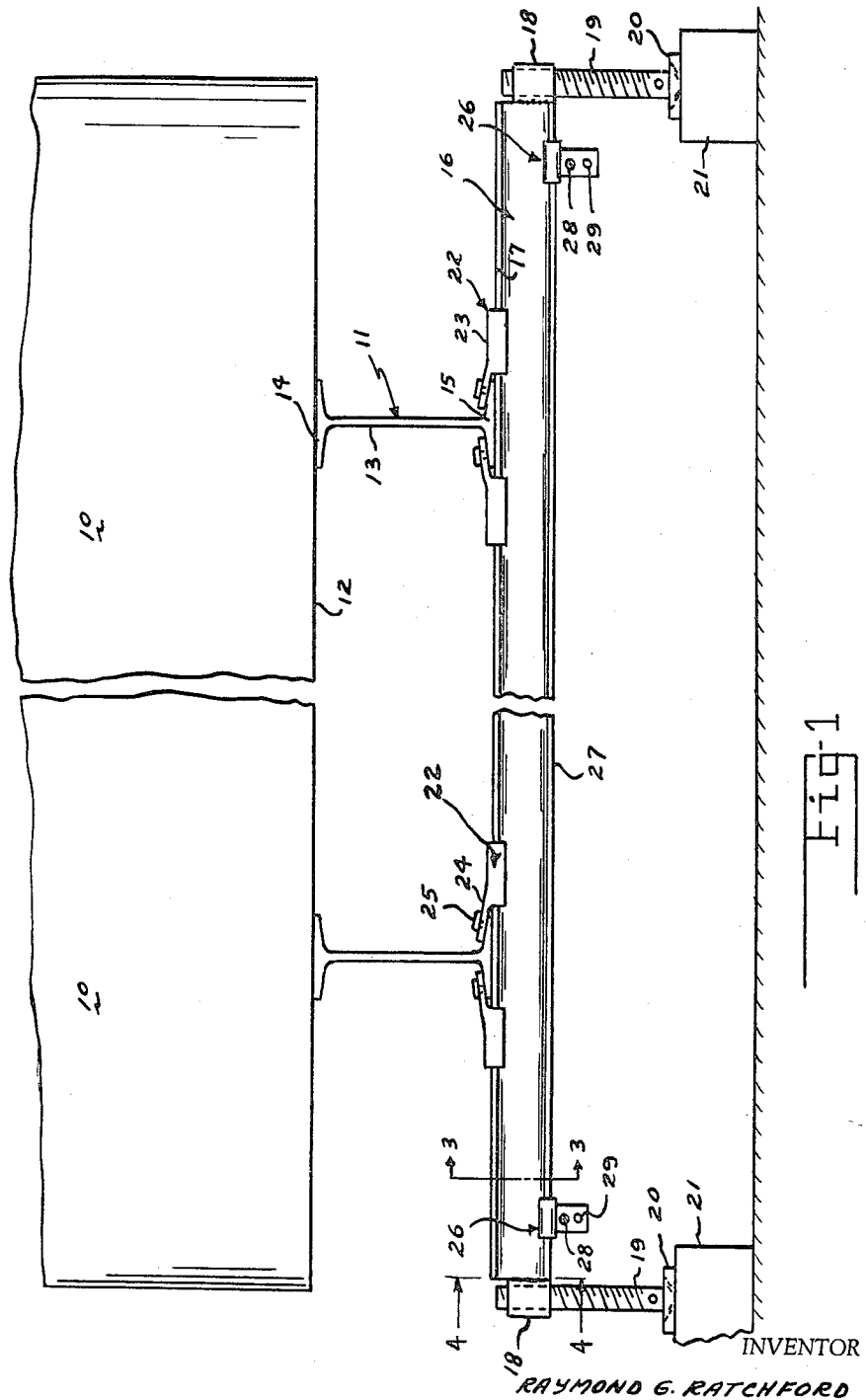

United States Patent Office 3,380,205
Patented Apr. 30, 1968

3,380,205
FOUNDATIONS FOR TRAILER TYPE HOMES
Raymond G. Ratchford, Dayton, Ohio, assignor to Ratchford Tool Corporation, Englewood, Ohio, a corporation of Ohio
Filed May 7, 1965, Ser. No. 454,118
6 Claims. (Cl. 52—126)

ABSTRACT OF THE DISCLOSURE

A foundation for a portable home or like supportable structure including beam means adjustable relative to ground surface and having anchor means slidable thereon by which a structure resting on the beam means may be releasably attached for stable installation.

This invention has particular application to portable enclosures such as trailer type homes. It provides an easily constructed and readily applied foundation enabling a temporarily fixed location of such a home in a manner offering maximum security to its occupants.

A trailer home has many advantages including low cost and ready transportability. However, it does have some disadvantages. One of the latter is an inherent instability particularly evidenced in high winds and driving rain.

Prior to occupancy of a trailer home for any length of time it must first be placed on a suitable foundation. The latter usually consists of stacked blocks variously distributed in underlying supporting relation to the home. Using this type of foundation it is quite difficult to achieve a level platform. Moreover, such a foundation fails to provide means either suitable or adequate for anchoring a trailer type home in a stable and secure condition.

The present invention obviates the problems above described in reference to trailer type homes. It provides a simple foundation means which may be easily applied and readily adapted to stabilize and anchor any portable structure such as a trailer home so as to render it extremely resistant to disturbance from a set location.

A primary object of the invention is to provide a foundation for portable structures, particularly for trailer type homes, which is economical to fabricate, most efficient and satisfactory in use and adaptable to a wide variety of applications.

A further object of the invention is to provide a foundation which is readily applicable to stably secure a portable structure such as a trailer type home in a set location.

Another object of the invention is to provide means for temporarily securing a relative portable structure in a manner to resist rocking, shaking and physical displacement by the elements.

An additional object of the invention is to provide a foundation means for trailer type homes and similar structures possessing the advantageous structural features, the inherent meritorious charatceristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention.

FIG. 1 is a partially diagrammatic fragmentary view of a trailer type home having a foundation such as provided by the present invention;

FIG. 2 is a side view of the structure as shown in FIG. 1;

FIG. 3 is a fragmentary detail view of component elements taken on line 3—3 of FIG. 1; and FIG. 4 is a fragmentary view taken on line 4—4 of FIG. 1.

Like parts are indicated by similar characters of reference throughout the several views.

The drawings diagrammatically illustrate the body 10 of a trailer home including rigidifying I-beams 11 extending below and longitudinally of its base 12. The beams 11 are transversely spaced, their web portions 13 being parallel and their upper flange portions 14 being in flush abutment with the base 12.

The foundation for this home, in a preferred form, includes a pair of I-beams 16, respectively placed fore and aft of the body 10 to have their upper flange portions 17 extend transversely of and in underlying flush abutment to the respective lower flange portions 15 of the beams 11.

Each of the beams 16 has a sleeve 18 welded at each end to have the central axis thereof lie in a plane generally common to its web portion 13. The sleeves 18 are internally threaded and each arranged to threadedly engage about one end of a threaded shaft 19. Each of the shafts 19 has its opposite end rotatably contained in a foot plate 20 which mounts on a base block 21.

As may be readily seen from the drawings, in setting up a foundation for a trailer type home, the base blocks 21 are disposed in longitudinally spaced pairs. The blocks of each pair are transversely spaced to position to the outer sides of the body 10. The respective blocks then mount their foot plates 20 and bearingly contained shafts 19. In the embodiment illustrated there are four rectangularly oriented shafts 19. Note that there could be six, eight, or any other even number of shafts dependent on the number of beams required to meet the needs of the particular application. Each transversiy disposed pair supports a beam 16 by respective threaded engagement in its end mounted sleeves 18.

The beams 16 support the body 10 as the bottom flanges 15 of the trailer beams 11 are caused to seat thereon, centered and at right angles thereto. Each shaft 19 includes suitable means for engagement thereof, adjacent its base, by a control bar (not shown). As will be obvious, the respective rotation of the shafts 19 by means of a control bar enables a simple and quick side to side and fore and aft leveling of the body 10.

Referring to the drawings the upper flange 17 of each beam 16 mounts two pairs of sleeve elements 22. From a vertical standpoint, the sleeve element 22 has a relatively flattened configuration. It includes a central portion 23 which immediately overlies the upper surface of the flange 17 to which it seats and end portions which wrap around the flange and extend thereunder to points adjacent the vertical web 13.

The sleeves 22 are adjustable so that when a body 10 seats to the beams 16 they may be readily disposed to opposite sides of each of its beams 11, and, more particularly, its flange portions 15 which flush mount to the beams 16. At their edges most adjacent a beam 11, each sleeve element has an upwardly inclined relatively projected plate portion 24. The plate portion 24 is adapted to overlie the adjacent flange portion 15. Each plate portion 24 includes a threaded aperture which receives a set screw 25. When the plate portions 24 are positioned over the adjacent portions of the flanges 15, the set screws 25 are turned to thereby establish a fixed relation between the beams 11 and the beams 16 on which they mount.

In the manner described, one may provide an insured, relatively fixed, and stable positioning of the body 10.

The positioning and containment of the beams 11 to the beams 16, as illustrated, is very simply achieved. Nevertheless, it is highly effective to inhibit any lateral or longitudinal shift or rocking of the body 10 relative its established foundation. This is so even in the event the trailer body is buffeted by high winds or driving rains.

It may thus be seen that the invention provides a relatively portable foundation which is at once economical to fabricate, simple to construct and easy to apply for its intended purpose. It may be used on a trailer home or any comparable structure with equal facility. Not only is the described foundation such to enable a solid base for a home but it is also one to lend stability and facilitate the leveling and anchoring of the home with a minimum involvement of time, effort and expense.

Attention is directed to the drawings wherein additional means are shown for further anchoring a mounted trailer home or similar structure, if such should be required. Note from FIG. 1 of the drawings that such means comprise split sleeves 26 engaged to and dependent from the lower flange 27 of each beam 16, respectively, spaced to either end. The sleeves 26 engage about the flange in the manner of the sleeves 22. However they have a split which is centered on the underside of the beam. The adjacent split portions of the sleeve 26 have dependent plate portions formed integral therewith. The latter include aligned apertures 28 and 29. The aligned apertures 28 accommodate a bolt which receives a nut to fasten the sleeve portions together. The aligned apertures 29 accommodate a cable adapted in one instance for connection to an external ground anchor or, in the alternative, to wrap around the body 10.

The invention thus provides a novel temporary base for a structure such as a trailer home which offers its occupants optimal security.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. Apparatus providing a foundation for trailer type homes and like structures, on pairs of transversely spaced blocks, comprising flanged beams for bridging the respective pairs of transversely spaced blocks, said beams disposing thereby in a transversely arranged longitudinally spaced relation, shaft elements means rotatably mounting said shaft elements to said blocks said shaft elements being threadedly engaged to said beams and providing means for elevating and depressing said beams to establish a stable platform thereby for a trailer type home or like structure and clamp means slidable on flanges of said beams having projected portions for placement over opposite facing portions of the trailer home, said projecting portions including means for engagement to said trailer home so as to relatively fix said home and clamp means to resist displacement on said beams.

2. A foundation for portable homes and like supportable structures, including beam means in underlying relation thereto comprised of first beam means secured to the underside of a supportable structure and second beam means mounted on a supporting surface, the said first beam means resting on said second beam means in angularly displaced crossing relation thereto and being selectively positionable thereon in lateral and longitudinal senses, clamp means having angularly displaced projecting portions simultaneously to overlap said first and second beam means respectively, said beam means having cooperating portions to interfit with respective projecting portions of said clamp means, said clamp means having a sliding mount on one of said first or second beam means to be adjustable toward and away from the other, and interacting means on said clamp means and said other beam means to fix said clamp means in an adjusted position on said one beam means, said clamp means having one of said angularly displaced projecting portions in a wrap around relation to said one beam means to define said sliding mount and to restrict relative lateral motion of said clamp means and another angularly displaced projecting portion of said clamp means mounting a screw stud reacting on a portion of said other beam means to apply a force in a direction frictionally to lock said clamp means to said one beam means, the said stud and said portion of said other beam means comprising said interacting means.

3. A foundation for portable homes and like supportable structures including beam means in underlying relation thereto comprised of first beam means secured to the underside of a supportable structure and second beam means mounted on a supporting surface, the said first beam means mounting on said second beam means in angularly displaced crossing relation thereto and being selectively positionable thereon in lateral and longitudinal senses, clamp means having angularly displaced projecting portions simultaneously to overlap said first and second beam means respectively, said beam means having cooperating portions to interfit with respective projecting portions of said clamp means, said clamp means having a sliding mount on one of said first or second beam means to be adjustable toward and away from the other, interacting means on said clamp means and said other beam means to fix said clamp means in an adjusted position on one of said beam means, said first and second beam means being characterized by interengaging flanges, an upper surface of the flange on said first beam means having a sloping configuration, one of said angularly displaced projecting portions of said clamp means having a wrap around relation to the flange on said second beam means and another angularly displaced projecting portion extending in relatively upwardly inclining relation to overlie and substantially conform to the sloping configuration of the flange on said first beam means, the interacting means between said clamp means and said first beam means including a screw stud installed in said other angularly projecting portion to bear on said sloping configuration.

4. A foundation according to claim 3, wherein said second beam means is mounted on a supporting surface in vertically spaced relation thereto and wherein further said second beam means has the cross sectional shape of an I beam with said clamp means being disposed in a wrap around relation to the upper flange of such I beam configuration, characterized by attachment means in a wrap around relation to the lower flange of said I beam configuration and having a dependent apertured portion for cable anchoring purposes.

5. A foundation for portable homes and like supportable structures, including first beam means in underlying relation thereto, comprised of second beam means mounting on a supporting surface and so arranged that the first said beam means rests on said second beam means in angularly displaced crossing relation thereto and is selectively positionable thereon in lateral and longitudinal senses, clamp means having angularly displaced projecting portions engaged to simultaneously overlap crossing portions of said beam means, said beam means having cooperating portions to interfit with respective projecting portions of said clamp means, said clamp means having a mount on one of said crossing portions of said beam means to be adjustable toward and retractable from the other and including means thereon to interact with said other beam means to fix the relative position of said clamp means and the related beam means.

6. A foundation as in claim 5 characterized by base plates mounted on said supporting surface in turn rotatively mounting vertically projected screws which are threadedly engaged with said second beam means to vertically adjust and level said second beam means and thereby achieve a level base for the supported structure.

References Cited
UNITED STATES PATENTS 2,722,040  11/1955  Ludowici _____ 52—126 X

FOREIGN PATENTS 816,753  1951  Germany.

FRANK L. ABBOTT, *Primary Examiner.*

G. W. HORNADAY, R. A. STENZEL, P. C. FAW,
*Assistant Examiners.*